(12) United States Patent
Bhandari et al.

(10) Patent No.: US 10,277,686 B2
(45) Date of Patent: Apr. 30, 2019

(54) SERVICE DISCOVERY OPTIMIZATION IN A NETWORK BASED ON BLOOM FILTER

(71) Applicant: Cisco Technology, Inc., San Jose, CA (US)

(72) Inventors: Shwetha Subray Bhandari, Bangalore (IN); Pascal Thubert, La Colle sur Loup (FR); Selvaraj Mani, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 1093 days.

(21) Appl. No.: 14/812,367

(22) Filed: Jul. 29, 2015

(65) Prior Publication Data
US 2017/0034285 A1    Feb. 2, 2017

(51) Int. Cl.
| | |
|---|---|
| H04L 29/08 | (2006.01) |
| H04L 12/741 | (2013.01) |
| H04L 12/701 | (2013.01) |
| H04L 12/751 | (2013.01) |

(52) U.S. Cl.
CPC ............ H04L 67/16 (2013.01); H04L 45/00 (2013.01); H04L 45/02 (2013.01); H04L 45/54 (2013.01); H04L 67/104 (2013.01); H04L 67/12 (2013.01); H04L 67/125 (2013.01)

(58) Field of Classification Search
CPC ......... H04L 67/16; H04L 45/02; H04L 67/12; H04L 67/104; H04L 67/125; H04L 67/2804; H04L 45/00; H04L 45/54; H04L 45/7453

USPC .......... 709/217, 224, 228; 706/46; 370/338, 370/254, 312, 328, 351, 389
See application file for complete search history.

(56) References Cited

U.S. PATENT DOCUMENTS

| | | | |
|---|---|---|---|
| 7,203,871 B2* | 4/2007 | Turner | G06F 11/1076 711/148 |
| 7,499,998 B2* | 3/2009 | Toebes | H04L 29/12066 709/203 |
| 2005/0108368 A1* | 5/2005 | Mohan | H04L 29/06 709/220 |
| 2005/0152305 A1* | 7/2005 | Ji | H04L 45/54 370/328 |
| 2005/0219929 A1* | 10/2005 | Navas | H04L 45/7453 365/212 |
| 2005/0223102 A1* | 10/2005 | Zhang | H04L 45/00 709/228 |

(Continued)

OTHER PUBLICATIONS

Ghaderi M, Towsley D, Kurose J. Reliability gain of network coding in lossy wireless networks. InINFOCOM 2008. The 27th Conference on Computer Communications. IEEE Apr. 13, 2008 (pp. 2171-2179). IEEE.*

(Continued)

*Primary Examiner* — Ranodhi Serrao
*Assistant Examiner* — James N Fiorillo
(74) *Attorney, Agent, or Firm* — Leon R. Turkevich

(57) ABSTRACT

In one embodiment, a method comprises generating, by a network device in a network, a Bloom filter bit vector representing services provided by service provider devices in the network; and the network device executing a service discovery operation based on identifying, relative to the Bloom filter bit vector, whether an identified service in a received message is executed in the network.

19 Claims, 8 Drawing Sheets

(56) References Cited

U.S. PATENT DOCUMENTS

| | | | |
|---|---|---|---|
| 2006/0184690 A1* | 8/2006 | Milliken | H04L 63/1466 709/238 |
| 2007/0008949 A1* | 1/2007 | Balandin | H04L 45/02 370/351 |
| 2007/0177554 A1* | 8/2007 | Yang | H04L 67/16 370/338 |
| 2011/0219010 A1* | 9/2011 | Lim | G06F 17/30 707/747 |
| 2011/0296051 A1* | 12/2011 | Vange | H04L 41/12 709/238 |
| 2012/0011150 A1* | 1/2012 | Swaminathan | G06F 17/30699 707/770 |
| 2012/0099587 A1* | 4/2012 | Fan | H04W 40/16 370/389 |
| 2013/0103795 A1* | 4/2013 | Kulkarni | H04L 67/125 709/217 |
| 2013/0263167 A1* | 10/2013 | Parthasarathy | H04L 41/5067 725/14 |
| 2013/0287024 A1* | 10/2013 | Herberg | H04L 47/323 370/392 |
| 2014/0211659 A1* | 7/2014 | Abraham | H04W 52/0209 370/254 |
| 2014/0359148 A1* | 12/2014 | Cherian | H04L 41/28 709/229 |
| 2015/0029927 A1* | 1/2015 | Janneteau | H04L 45/02 370/312 |
| 2015/0055509 A1* | 2/2015 | De Bus | H04L 12/2809 370/254 |
| 2015/0139213 A1* | 5/2015 | Abraham | H04L 69/28 370/338 |
| 2015/0304118 A1* | 10/2015 | Janneteau | H04L 45/02 370/312 |
| 2015/0363704 A1* | 12/2015 | Yong | H04L 67/16 706/46 |
| 2015/0372875 A1* | 12/2015 | Turon | H04W 76/10 370/254 |
| 2016/0014694 A1* | 1/2016 | Patil | H04W 52/0219 370/254 |
| 2016/0183176 A1* | 6/2016 | Lee | H04W 76/14 455/434 |
| 2016/0212698 A1* | 7/2016 | Guo | H04W 52/0203 |
| 2016/0255535 A1* | 9/2016 | De Foy | H04L 67/2804 370/236 |
| 2016/0337456 A1* | 11/2016 | Pathak | H04L 67/16 |

OTHER PUBLICATIONS

Ghaderi M, Towsley D, Kurose J. Reliability gain of network coding in lossy wireless networks. InINFOCOM 2008. The 27th Conference on Computer Communications. IEEE Apr. 13, 2008 (pp. 2171-2179). IEEE. (Year: 2008).*

Palattella, Ed., et al., "Terminology in IPv6 over the TSCH mode of IEEE 802.15.4e", [online], Jan. 8, 2015, [retrieved on Feb. 18, 2015]. Retrieved from the Internet: <URL: http://tools.ietf.org/pdf/draft-ietf-6tisch-terminology-03.pdf>, pp. 1-14.

Thubert, Ed., "An Architecture for IPv6 over the TSCH mode of IEEE 802.15.4", [online], May 12, 2015, [retrieved on May 19, 2015]. Retrieved from the Internet: <URL: https://tools.ietf.org/pdf/draft-ieff-6tisch-architecture-08.pdf>, pp. 1-42.

Wijnands, Ed., et al., "Multicast using Bit Index Explicit Replication", [online], Apr. 27, 2015, [retrieved on May 28, 2015]. Retrieved from the Internet: <URL: https://tools.ietf.org/pdf/draft-ietf-bier-architecture-00.pdf>, pp. 1-31.

Kumar et al., "BIER Use Cases", [online], Oct. 25, 2014, [retrieved on May 28, 2015]. Retrieved from the Internet: <URL: https://tools.ietf.org/pdf/draft-kumar-bier-use-cases-00.pdf>, pp. 1-7.

Badman, "PETITION From Educause Higher Ed Wireless Networking Admin Group", [online], [retrieved on May 22, 2015]. Retrieved from the Internet: <URL: https://www.change.org/p/from-educause-higher-ed-wireless-networking-admin-group>, pp. 1-8.

Armstrong et al., "Multicast Transport Protocol", Network Working Group, Request for Comments: 1301, Feb. 1992, pp. 1-38.

Winter, Ed, et al., "RPL: IPv6 Routing Protocol for Low-Power and Lossy Networks", Internet Engineering Task Force (IETF), Request for Comments: 6550, Mar. 2012, pp. 1-157.

Cheshire et al., "Multicast DNS", Internet Engineering Task Force (IETF), Request for Comments: 6762, Feb. 2013, pp. 1-70.

Cheshire et al., "DNS-Based Service Discovery", Internet Engineering Task Force (IETF), Request for Comments: 6763, Feb. 2013, pp. 1-49.

Goyal, Ed., et al., "Reactive Discovery of Point-to-Point Routes in Low-Power and Lossy Networks", Internet Engineering Task Force (IETF), Request for Comments: 6997, Aug. 2013, pp. 1-40.

Wikipedia, "Multicast DNS", [online], Apr. 1, 2015, [retrieved on May 22, 2015]. Retrieved from the Internet: <URL: http://en.wikipedia.org/w/index.php?title=Multicast_DNS&printable=yes>, pp. 1-4.

Thubert et al., U.S. Appl. No. 14/516,707, filed Oct. 17, 2014.

Levy-Abegnoli et al., U.S. Appl. No. 14/516,799, filed Oct. 17, 2014.

Thubert et al., U.S. Appl. No. 14/643,190, filed Mar. 10, 2015.

Thubert et al., U.S. Appl. No. 14/661,458, filed Mar. 18, 2015.

Kalmar et al., "Context-aware Addressing in the Internet of Things using Bloom Filters", [online], CogInfoCom 2013, 4th IEEE International Conference on Cognitive Infocommunications, Dec. 2-5, 2013, Budapest, Hungary, [retrieved on Jun. 26, 2018]. Retrieved from the Internet: URL: <https://ieeexplore.ieee.org/document/6719296/>, pp. 487-492.

Kalmar et al., "CAEsAR: A Context-Aware Addressing and Routing Scheme for RPL Networks", [online], IEEE ICC 2015 SAC—Internet of Things, [retrieved on Jun. 26, 2018]. Retrieved from the Internet: URL: <https://ieeexplore.ieee.org/document/7248393/>, pp. 635-641.

* cited by examiner

SERVICE DISCOVERY OPTIMIZATION IN A NETWORK BASED ON BLOOM FILTER

TECHNICAL FIELD

The present disclosure generally relates to optimization of service discovery in a network based on one or more bloom filters.

BACKGROUND

This section describes approaches that could be employed, but are not necessarily approaches that have been previously conceived or employed. Hence, unless explicitly specified otherwise, any approaches described in this section are not prior art to the claims in this application, and any approaches described in this section are not admitted to be prior art by inclusion in this section.

Service discovery in large-scale deployments of wireless link layer networks typically involves a multicast service discovery protocol, for example to the Internet Engineering Task Force (IETF) Request for Comments (RFC) 6762 or 6763: such use of a multicast service discovery protocol, however, suffers from numerous problems including performance and scalability issues. Such performance and scalability issues still exist if attempts are made to maintain services across gateway agents executed in backbone routers of respective network domains, as network administrators are required to manually limit or filter the services across the backbone routers to minimize the associated multicast service discovery messages.

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises generating, by a network device in a network, a Bloom filter bit vector representing services provided by service provider devices in the network; and the network device executing a service discovery operation based on identifying, relative to the Bloom filter bit vector, whether an identified service in a received message is executed in the network.

In another embodiment, an apparatus comprises a device interface circuit and a processor circuit. The device interface circuit is configured for receiving a message in a network. The processor circuit is configured for generating a Bloom filter bit vector representing services provided by service provider devices in the network. The processor circuit further is configured for executing a service discovery operation based on identifying, relative to the Bloom filter bit vector, whether an identified service in the received message is executed in the network.

In another embodiment, one or more non-transitory tangible media are encoded with logic for execution by a machine, and when executed by the machine operable for: generating, by the machine in a network, a Bloom filter bit vector representing services provided by service provider devices in the network; and the machine executing a service discovery operation based on identifying, relative to the Bloom filter bit vector, whether an identified service in a received message is executed in the network.

DETAILED DESCRIPTION

Particular embodiments enable on-demand and scalable service discovery operations across one or more network domains in a data network based on generating a Bloom filter bit vector representing services provided by service provider devices in the data network. The Bloom filter bit vector can be generated by one or more network devices that execute service agents, also referred to herein as "service agent devices". The service agent can be executed by a service agent device deployed as a backbone router ("root") of a Low Power and Lossy Network (LLN); the service agent also can be executed by one or more service agent devices deployed as wireless network devices within the LLN, for example a parent (i.e., non-leaf) node within a tree-based topology (e.g., a Directed Acyclic Graph (DAG)) providing reachability to the "root" backbone router.

Figure 1:
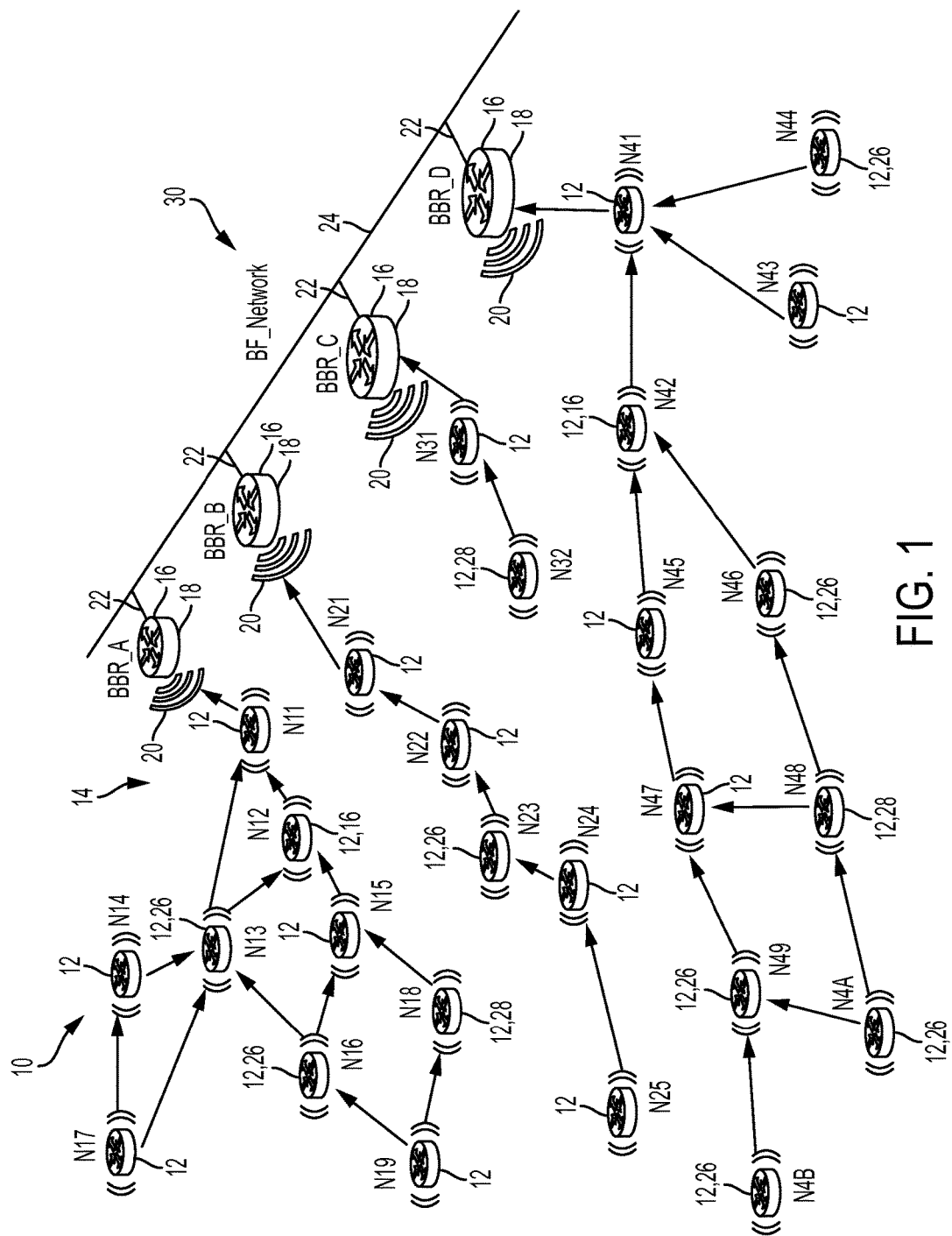
FIG. 1 illustrates an example system having an apparatus for generating a Bloom filter bit vector representing services provided by service provider devices in the network for executing service discovery operations, according to an example embodiment.

FIG. 1 illustrates an example data network 10 having one or more wireless network devices 12 in an LLN 14 and including one or more service agent devices 16 configured for generating a Bloom filter bit vector (e.g., "BF_Network" 30) for service discovery operations, according to an example embodiment. The service agent device 16 can be implemented as a wireless network device (e.g., "N12" or "N42") 12 or a border router device (e.g., "BBR_A", "BBR_B", "BBR_C", "BBR_D") 18 acting as a "root" backbone router device; the service agent device 16 also can be implemented as any other type of network device, for example a link-layer network switch, a network controller, etc.; hence, the service agent operations described herein can be executed by any one of the wireless network devices 12 and/or any one of the border router devices 18, as appropriate.

Each border router device 18 can provide a wireless connection 20 for the wireless network devices 12 and a wired connection 22 for reaching other destinations via a backbone network 24, for example one or more service provider devices 26 providing one or more identified services. The backbone network 24 also can include backbone routers (not shown) for routing network traffic in the backbone network 24.

As illustrated in FIG. 1, each border router device 18 serves as a "root" for a routing topology overlying a link layer mesh network, enabling each border router device 18 to serve as a root for a corresponding subnetwork or "domain". For example, the border router device "BBR_A" 18 serves as a "root" for the tree-based DAG topology (e.g., "domain A") established by the wireless network devices "N11" through and including "N19"; the border router device "BBR_B" 18 serves as a "root" for the tree topology (e.g., "domain B") established by the wireless network devices "N21" through and including "N25"; the border router device "BBR_C" 18 serves as a "root" for the chain topology (e.g., "domain C") established by the wireless network devices "N31" and "N32"; the border router device "BBR_D" 18 serves as a "root" for the tree-based DAG topology (e.g., domain "D") established by the wireless network devices "N41" through and including "N4B" (hexadecimal notation is used to identify the "tenth" network device "N4A" and the "eleventh" network device "N4B" each attached to the network device "N49"). The wireless network devices 12 can attach to a parent device 12 and/or 18 via various techniques, for example according to RFC 6550. The border router devices 18 can utilize various administrative policies to define sharing of services across the domains "A", "C", and/or "D".

Each wireless network device 12 can operate as any one of a service agent device 16 (e.g., devices "N12" and "N42" 12), a service provider device 26 (e.g., devices "N13", "N16", "N23", "N44", "N46", "N49", "N4A" (hexadecimal), or "N4B" (hexadecimal)), and/or a service consumer device 28 (e.g., devices "N18", "N32", or "N48").

Figure 2:
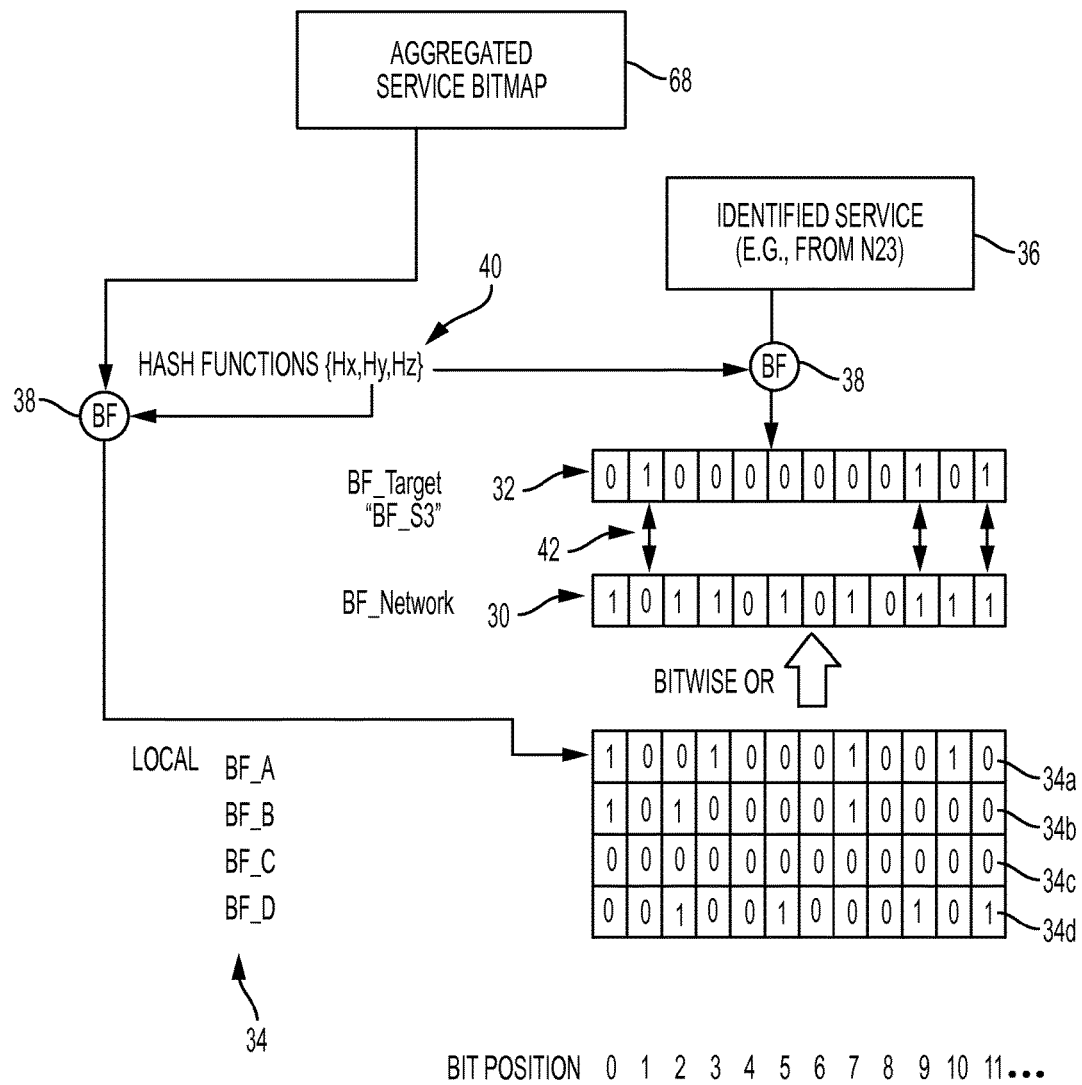
FIG. 2 illustrates in further detail an example generating a Bloom filter bit vector representing services provided by service provider devices in the network for executing service discovery operations, according to an example embodiment.

FIG. 2 illustrates in further detail an example generating a Bloom filter bit vector ("BF_Network") 30 representing services provided by service provider devices 26 in the data network 10 for executing service discovery operations, according to an example embodiment. Each service agent device 16 of FIG. 1 can be configured for generating one or more Bloom filters (30, 32, and/or 34) representing one or more services provided by service provider devices 26 in the data network 10.

A Bloom filter (e.g., 30, 32, and/or 34) is a space-efficient probabilistic data structure implemented as a bit array of "m" bits (e.g., m=65,536 bits decimal) to test whether an element is a member of a set: the test result is that an element is either "possibly in the set," or "definitely not in the set"; hence, a false positive result is possible in a Bloom filter, but a false negative is not possible.

According to an example embodiment, a Bloom filter (e.g., 30, 34, or 44 of FIG. 3) of one or more identified services provided by one or more service provider devices 26 in a data network 10 can be used to determine instantaneously whether an identified service 36 in a received message is "definitely not in the set" of existing services provided in the data network 10, i.e., whether the identified service is not provided in the data network 10. The identified service 36 in a received message (e.g., a duplicate service detection message, a new service announcement message, a service query message, and/or a service request message) can be "identified" in various forms, for example based on service type (56 of FIG. 3), service name 58, and/or a unique bit position having been assigned to the identified service in a bit-indexed service bitmap (60 of FIG. 3).

A network device such as a parent network device (e.g., "N12" or "N42" 12), a border router device 18, a switching device, and/or a router device can generate a Bloom filter representation 32 of an identified service (i.e., an "identified service Bloom filter" or "target service Bloom filter") based on executing a hashing operation 38 on the identified service 36 based on one or more prescribed hash functions 40: each hash function (e.g., "Hx") 40 maps the identified service 36 to one and only one bit that is set within the m-bit array 32, such that hashing a single identified service with "k" distinct hash functions can cause up to "k" distinct bits to be set in the m-bit array (k<m). The m-bit identified service Bloom filters 30, 32, and/or 34 can be combined (e.g., bitwise OR) to create a network Bloom filter "BF_Network" 30 representing services provided by all service provider devices 26 in the data network 10.

Hence, a service agent device 16 can determine whether an identified service 36 specified in a received message is not a duplicate of any of services in the network based on generating in operation 38 an identified service Bloom filter 32 using the same one or more prescribed hash functions 40, and comparing the identified service Bloom filter 32 with the network Bloom filter 30 generated based on the same one or more prescribed hash functions. As illustrated in FIG. 2, a service agent device 16 can compare in operation 42 the target service Bloom filter (e.g., "BF_S3") 32 of an identified service (e.g., "Web Svr./Web1") 36 to the network Bloom filter 30 to determine if there is no duplicate of any of the services provided by service provider devices 26 in the data network 10, based on determining if there are matching bits with no non-matching bits in the network Bloom filter 30 relative to the identified service Bloom filter 32. Specifically, a duplicate may exist only if each of the bit positions set in the target service Bloom filter (BF_Target (0,m)) 32 also are set in the network Bloom filter (BF_Network(0,m)) 30, i.e., only if the following bitwise AND operation is true:

$$BF\_Target(0,m) \text{ AND } BF\_Network(0,m) = BF\_Target(0,m) \quad (1).$$

If there is at least one non-matching bit in the network Bloom filter 30 relative to the identified service Bloom filter 32, the identified service 36 is not a duplicate of any other service in the data network 10. As illustrated in FIG. 2, the identified service 36 is not a duplicate of any service executed by any other service provider device 26 in the data network 10 because the bit position 1 of the identified service Bloom filter 32 is set to "1" but the corresponding bit position 1 of the network Bloom filter 30 is set to "0".

Hence, if no duplicate of the identified service Bloom filter 32 exists in the network Bloom filter 30, then the identified service 36 is not a duplicate of any service executed by any other service provider device 26 in the data network 10. If in operation 42 there is no possible duplicate of the identified service 36, the service agent device 16 can execute the appropriate service discovery operation depending on the message received, including allowing addition of the identified service 36 to the network Bloom filter 30 as a newly-announced service in response to a new service announcement message from a service provider device 26. The lack of any possible duplicate in operation 42 also can be used to respond to a query whether the identified service 36 is available (e.g., a duplicate service detection (DSD) message from a service provider device 26 or a service query message from a service consumer device 28), or a request for execution of the identified service 36 by a service consumer device 28 (e.g., a service request message); in this case, the received message (e.g., DSD message, service query message, or service request message) can be dropped to halt further propagation in the LLN 14.

As described in further detail below, if the bitwise AND operation in equation (1) is true because there are matching bits with no non-matching bits in the network Bloom filter 30 relative to the identified service Bloom filter 32, the service agent device 16 can issue unicast query messages to other service agent devices 16 (or one or more service provider devices 26) to confirm whether or not a duplicate service is already executed by another service provider device 26 in the data network 10.

According to an example embodiment, service agent devices 12 can exchange Bloom filter bit vectors generated based on identified services specified within received messages (e.g., a duplicate service detection query message, a new service announcement message, a service discovery query message, and/or service request message). For example, a service agent device 16 implemented as a parent network device (e.g., "N12" 12) can forward toward its "root" border router device (e.g., "BBR_A") 18 a message (e.g., a destination advertisement object (DAO) message) specifying the individual target service Bloom filters "BF_S1" and "BF_S2" 32 and/or a subnetwork Bloom filter (e.g., "BF_N12" of FIG. 3) 44 representing all services provided by service provider devices (e.g., "N13" and "N16") 16 in the subnetwork (e.g., sub-DAG), and reachability information (62 of FIG. 3), for example specifying that the services are reachable by the parent network device (e.g., "N12" 12). In response to receiving the DAO message from the wireless network device "N12" 12, the next-hop wireless network device "N11" 12 (in storing mode) can update its route entries to specify that the services specified in the received DAO message (as individual target service Bloom filters "BF_S1" and "BF_S2" 32 and/or the subnetwork Bloom filter (e.g., "BF_N12") are reachable via the wireless network device "N12" 12; the wireless network device "N11" 12 can output an updated DAO message specifying that the as individual target service Bloom filters "BF_S1" and "BF_S2" 32 and/or the subnetwork Bloom filter (e.g., "BF_N12") are reachable via the device "N11". As described below, each wireless network device 12 also can be identifiable via a corresponding unique device bitmap.

In response to receiving the DAO message from the wireless network device "N11", the border router device "BBR_A" 18 can first determine in operation 42 of FIG. 2 that there are no duplicates in the received individual target service Bloom filters "BF_S1" and "BF_S2" 32 and/or the subnetwork Bloom filter "BF_N12" 44 that would "conflict" with the existing network Bloom filter 30; assuming there are no conflicts, the border router device "BBR_A" 18 can update its local border router Bloom filter "BF_A" 34a and the network Bloom filter 30 by executing an OR operation with the received individual target service Bloom filters "BF_S1" and "BF_S2" 32 and/or the subnetwork Bloom filter "BF_N12" 44. The border router device "BBR_A" 18 also can send a message to the peer border router devices "BBR_B", "BBR_C", and "BBR_D" 18 that the updated local border router Bloom filter 34a is reachable via the border router device "BBR_A" 18. If preferred, a border router device (e.g., "BBR_D" also can propagate "downward" the network Bloom filter 30 to a service agent device 16 executed by a parent device (e.g., "N42") 12 within its subnetwork.

Hence, any one service agent device 16 can instantaneously determine whether an identified service 36 in a received message is not a duplicate of any service provided in the data network 10 based on one or more of the Bloom filter bit vectors (e.g., 30, 34, 44). The Bloom filter bit vectors generated based on the same hash function(s) can be combined (e.g., using a bitwise-OR operation) into a single network Bloom filter 30, enabling instantaneous determination if the identified service 30 is not a duplicate of any of the services provided by service provider devices 26 in the data network 10; alternately, each border router device 18 can receive device-specific (e.g., switch-specific) hash functions and respective remote Bloom filter bit vectors, enabling each switching device or "root" backbone router 18 to compare an identified service 36 to each of the remote Bloom filter bit vectors according to the associated switch-specific hash functions.

Hence, the service agent devices 18 can establish a network Bloom filter 30 for service discovery operations in a scalable manner that minimizes messaging throughout the data network 10, as each service agent device 18 can send a unicast address resolution message to an identifiable remote service agent device associated with a remote Bloom filter having a matching bit indicating a possible existing identified service. Example service discovery operations can include duplicate service detection (DSD) in response to a DSD message from a service provider device, new service announcement message processing in response to a new service announcement from a service provider device, service query message processing in response to a service query message from a service consumer device, and/or service request message processing in response to a service request message from a service consumer device.

Figure 3:
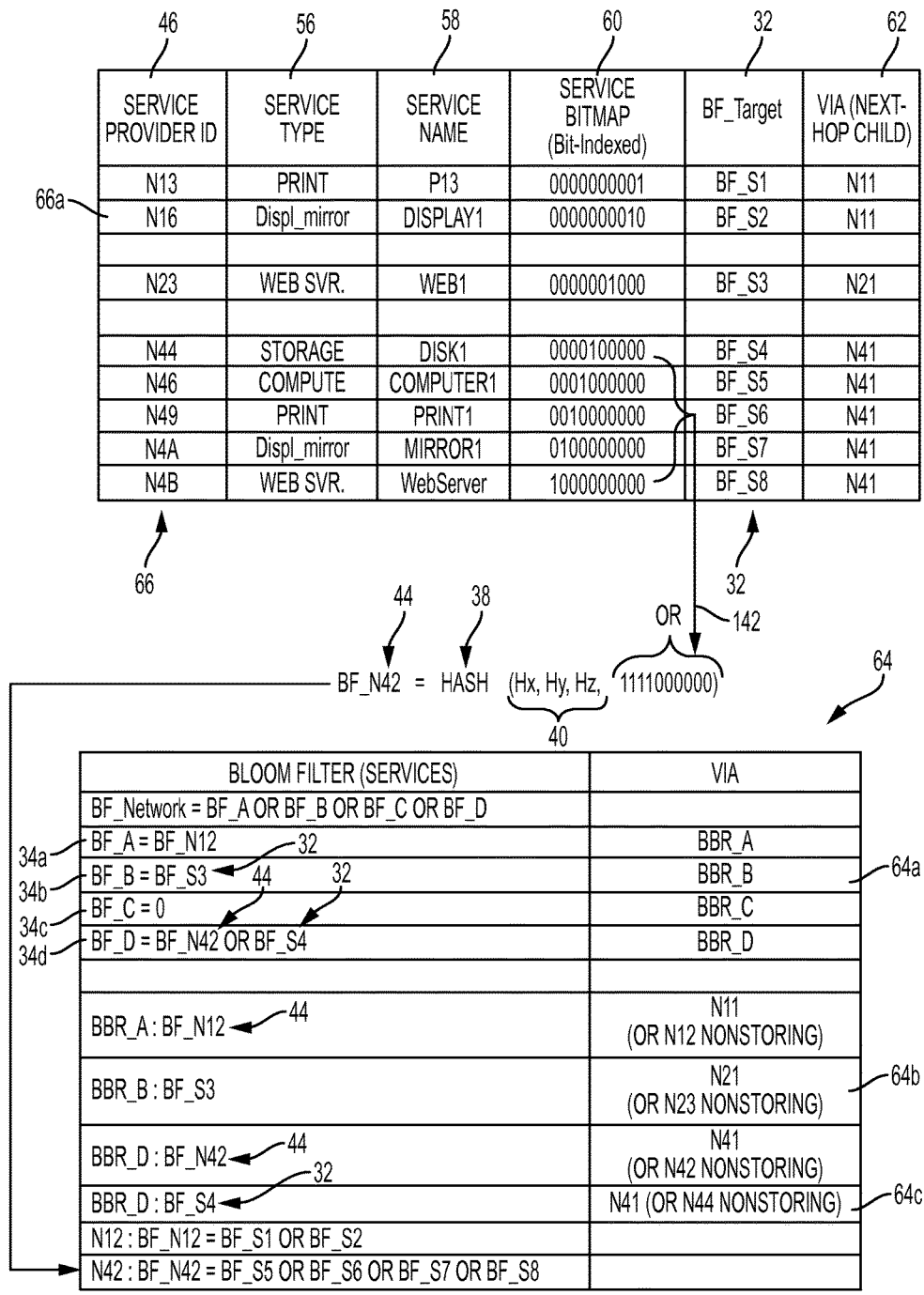
FIG. 3 illustrates in further detail an example generating a Bloom filter bit vector based on aggregation of service bitmaps received from sensor provider devices in the network, according to an example embodiment.

Additional details with respect to FIG. 3 will be described below.

Figure 4:
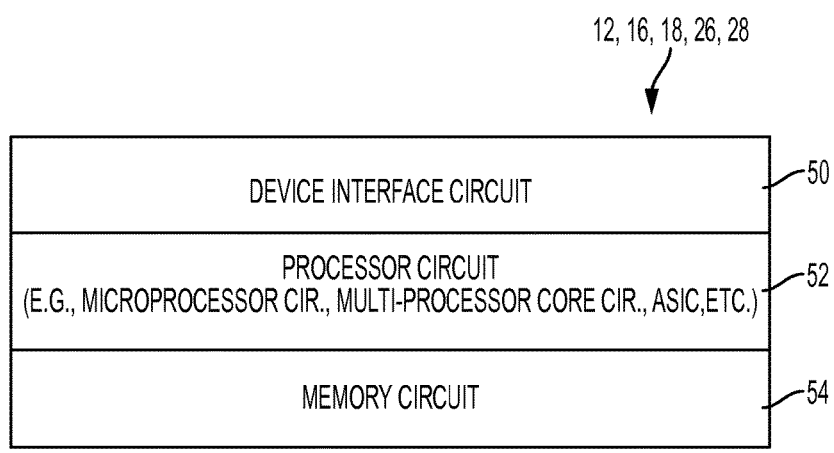
FIG. 4 illustrates an example implementation of any one of the devices of FIG. 1, according to an example embodiment.

FIG. 4 illustrates an example implementation of any one of the devices 12, 16, 18, 26, and/or 28 of FIG. 1, according to an example embodiment. The term "configured for" or "configured to" as used herein with respect to a specified operation refers to a device and/or machine that is physically constructed and arranged to perform the specified operation.

Each apparatus 12, 16, 18, 26, and/or 28 can include a device interface circuit 50, a processor circuit 52, and a memory circuit 54. The device interface circuit 50 can include one or more distinct physical layer transceivers for communication with any one of the other devices 12, 16, 18, 26, and/or 28; the device interface circuit 50 also can include an IEEE based Ethernet transceiver for communications with the devices of FIG. 1 via any of the links 24a, 24b, 24c, 24d, 26, 28 (e.g., a wired or wireless link, an optical link, etc.). The processor circuit 52 can be configured for executing any of the operations described herein, and the memory circuit 54 can be configured for storing any data or data packets as described herein.

Any of the disclosed circuits of the devices 12, 16, 18, 26, and/or 28 (including the device interface circuit 50, the processor circuit 52, the memory circuit 54, and their associated components) can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 54) causes the integrated circuit(s) implementing the processor circuit to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 54 can be implemented, for example, using a non-volatile memory such as a programmable read only memory (PROM) or an EPROM, and/or a volatile memory such as a DRAM, etc.

Further, any reference to "outputting a message" or "outputting a packet" (or the like) can be implemented based on creating the message/packet in the form of a data structure and storing that data structure in a non-transitory tangible memory medium in the disclosed apparatus (e.g., in a transmit buffer). Any reference to "outputting a message" or "outputting a packet" (or the like) also can include electrically transmitting (e.g., via wired electric current or wireless electric field, as appropriate) the message/packet stored in the non-transitory tangible memory medium to another network node via a communications medium (e.g., a wired or wireless link, as appropriate) (optical transmission also can be used, as appropriate). Similarly, any reference to "receiving a message" or "receiving a packet" (or the like) can be implemented based on the disclosed apparatus detecting the electrical (or optical) transmission of the message/packet on the communications medium, and storing the detected transmission as a data structure in a non-transitory tangible memory medium in the disclosed apparatus (e.g., in a receive buffer). Also note that the memory circuit 54 can be implemented dynamically by the processor circuit 52, for example based on memory address assignment and partitioning executed by the processor circuit 52.

FIGS. 5-8 illustrate example methods by the processor circuit 52 of any one of the service agent devices 16 of FIG. 1, according to an example embodiment. The operations described with respect to any of the Figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.). Hence, one or more non-transitory tangible media can be encoded with logic for execution by a machine, and when executed by the machine operable for the operations described herein.

In addition, the operations described with respect to any of the Figures can be performed in any suitable order, or at least some of the operations in parallel. Execution of the operations as described herein is by way of illustration only; as such, the operations do not necessarily need to be executed by the machine-based hardware components as described herein; to the contrary, other machine-based hardware components can be used to execute the disclosed operations in any appropriate order, or at least some of the operations in parallel.

Figure 5:
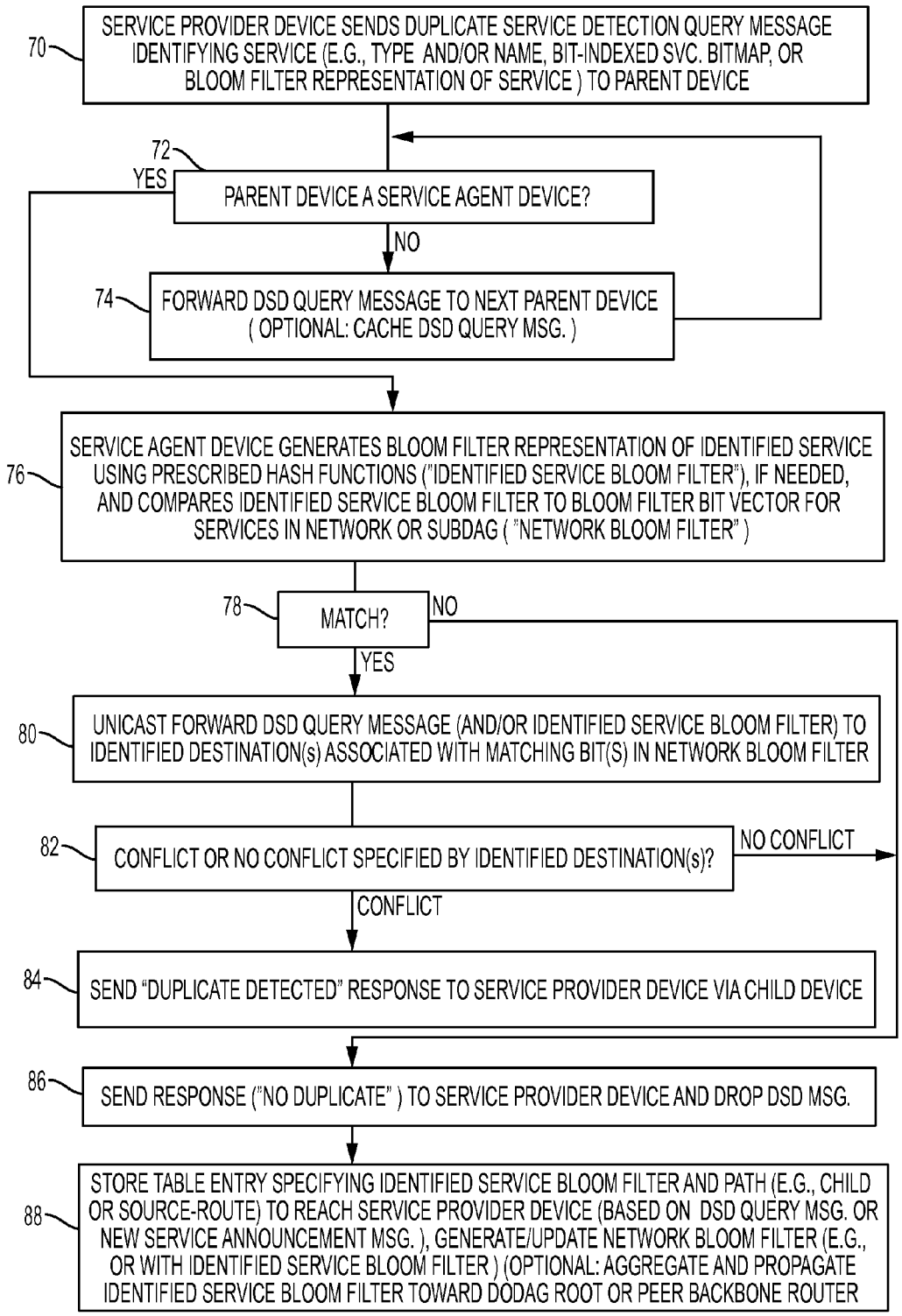
FIG. 5 illustrates an example generating a Bloom filter bit vector representing services provided by service provider devices in the network for executing service discovery operations, according to an example embodiment.

FIG. 5 illustrates a service agent device 16 executing the service discovery operation of duplicate service detection and new service announcement message processing, according to an example embodiment. Following formation of the LLN 14 in FIG. 1, a wireless network device 12 operating as a service provider device 26 (e.g., "N16") can send in operation 70 a duplicate service detection (DSD) query message to a next-hop parent device 12. The DSD query message identifies an identified service 36 as a "proposed" service: the "proposed" service is not limited by any name or type, especially since the "proposed" service could be a new service that has not previously been announced; hence, the service type 56 can be any previously defined type or undefined type, and the service name 58 can be any previously undefined name.

Depending on implementation, the identified service 36 can be expressed in the DSD query message by service type 56 and/or service name 58; alternately, if the service has already been allocated a unique bit position in a bit-indexed service bitmap 60 (e.g., by a service agent executed in a border router device 18, a network administrator, etc.), the DSD query message may identify the "proposed" service based on the corresponding identified service 36. The service provider device (e.g., "N16") 26 also can be configured for specifying its own identified service Bloom filter "BF_S2" 32 in the DSD query message if the service provider device (e.g., "N16") 26 has received the hash functions 40 from a service agent device 16; the service provider device (e.g., "N16") 26 also can send a separate request to the service agent device 16 (e.g., "N12") for generating the identified service Bloom filter "BF_S2" 32 of the identified service 36, enabling the service agent device 16 (e.g., "N12") to generate and return the identified service Bloom filter "BF_S2" 32 to the service provider device (e.g., "N16") 26. Hence, the DSD query message originated by the service provider device 26 can identify the service as any one of the service type 56, the service name 58, the bit-indexed service bitmap 60, and/or the identified service Bloom filter 32.

The device interface circuit 50 of the next-hop parent device (e.g., "N13" or "N15") 12 is configured for receiving in operation 72 the DSD query message from its child device (e.g., "N16"). If in operation 72 the processor circuit 52 of the next-hop parent device 12 determines it is not operating as a service agent device 16, the next-hop parent device 12 in operation 74 can forward the DSD query message to the next-hop parent device (e.g., "N12"); the processor circuit 52 of the parent device 12 in operation 74 also can cache the DSD query message in its memory circuit 54. The DSD query message can be propagated until it reaches a wireless network device 12, for example the service agent device "N12" 16.

In response to the device interface circuit 50 of the service agent device "N12" 16 receiving the DSD query message in operation 76, the processor circuit 52 of the service agent device 16 is configured for generating in operation 76 the Bloom filter representation "BF_S2" 32 of the identified service 36 using the prescribed hash functions 40 (assuming the DSD query message does not already specify the identified service Bloom filter 32). The processor circuit 52 of the service agent device 16 in operation 76 also is configured for comparing the identified service Bloom filter 32 to the network Bloom filter 30 (operation 42 of FIG. 2).

As described previously with respect to Equation (1), if in operation 78 there is a "match" such that if there are matching bits with no non-matching bits in the network Bloom filter 30 relative to the identified service Bloom filter "BF_S2" 32 (i.e., all the set bits in the identified service Bloom filter 32 also are set in the network Bloom filter 30), the processor circuit 52 of the service agent device 16 parses its local Bloom filter table entries 64 and/or service table entries 66 (FIG. 3) stored in its memory circuit 54 to identify a matching local border router Bloom filter 34 or a local service having an identically-matching Bloom filter representation 32. As illustrated in FIGS. 2 and 3, if the service agent device 16 cannot locally resolve whether there is an identically-matching Bloom filter representation 32 creating a conflict with the identified service Bloom filter "BF_S2" 32 obtained from the DSD query message, the processor circuit 52 of the service agent device 16 in operation 80 can unicast forward the DSD query message (and/or the identified service Bloom filter "BF_S2" 32 obtained from the DSD query message) to one or more identified destinations associated with matching bits in the identified service Bloom filter 32. For example, a parent device "N12" can forward the DSD query message via its default route toward the border router device "BBR_A" 18: if the border router device "BBR_A" 18 determines from its Bloom filter table entry 64a that the matching bits are based on the local border router Bloom filter 34b supplied by the border router device "BBR_B" 18, it can forward the DSD query message to the border router device "BBR_B" 18; if the border router device "BBR_B" 18 determines in operation 82 from its Bloom filter table entry 64b that the identified service Bloom filter "BF_S2" 32 obtained from the DSD query message is an identical match to any stored service Bloom filter (e.g., "BF_S3") 32 according to Equation (1), the processor circuit 52 of the border router device "BBR_B" 18 can send a "Duplicate Detected" response to the requesting border router device "BBR_A" 18, causing the border router device "BBR_A" 18 to forward the "Duplicate Detected" response to the requesting parent device "N12" 12 executing the service agent device 16.

Hence, the service agent device 16 can respond to a detected conflict in operation 84 by sending a "Duplicate Detected" message to the service provider device (e.g., "N16") 26 having originated the DSD query message via its child device, minimizing the transmission of the DSD query message to only those nodes having provided matching bits relative to the network Bloom filter 30.

If in operations 78 or 82 the processor circuit 52 of the service agent device 16 responding to the DSD query message determines that there is no conflict as described above with respect to Equation (1), the processor circuit 52 of the service agent device 16 can send a "No Duplicate" response in operation 86 to the service provider device (e.g., "N16") 26 having originated the DSD query message, and drop further transmission of the DSD message. Alternately, the service agent device 16 can output no response, and permit the service provider device (e.g., "N16") 26 having originated the DSD query message to output a New Service Announcement message in response to a determined absence of any "Duplicate Detected" message after a prescribed time interval (e.g., a prescribed timeout interval).

The processor circuit 52 of the service agent device 16 in operation 88 can store a service table entry 66 (e.g., 66a) in its memory circuit 54 in response to the DSD query message and/or a new service announcement message generated by the service provider device (e.g., "N16") 26. As illustrated in FIG. 3, the service table entry 66a can specify a service provider identifier 46, for example an IPv4 or IPv6 address, a unique MAC address, a device bitmap (described below), or any other identifier that uniquely identifies the service provider device (e.g., "N16") 26 in the subnetwork of the border router "BBR_A" 18. The service table entry 66a also can specify any one of service type 56, service name 58, and/or bit-indexed service bitmap 60 that identifies the identified service 36. Hence, a service identified only by service type 56 can have its identified service Bloom filter 32 generated in operation 38 (FIG. 2) based on the corresponding service type 56; a service identified only by service name 58 can have its identified service Bloom filter 32 generated in operation 38 based on the corresponding service name 58; a service identified by both service type 56 and service name 58 can have its identified service Bloom filter 32 generated in operation 38 based on a concatenation of the corresponding service type 56 and service name 58; a service identified by its bit-indexed service bitmap 60 can have its identified service Bloom filter 32 generated in operation 38 based on the corresponding bit-indexed service bitmap 60. The service table entry 66a also can specify the corresponding identified service Bloom filter "BF_S2" 32 and reachability information 62, enabling the service agent device 16 (e.g., the border router device "BBR_A" 18) to reach the service provider device 26 executing the service that is identified by the corresponding identified service Bloom filter 32; if the entry 66a is stored by the service agent device 16 executed in the parent device "N12" 12, the parent device "N12" can specify that the service identified by the bloom filter "BF_S2" 32 is reachable via the next-hop child device "N13" or "N15".

The service agent device 16 in operation 88 also can generate or update the network Bloom filter 30 and/or the local border router Bloom filter 34 based on executing a bitwise OR operation between the network Bloom filter 30 and the identified service Bloom filter 32 (and/or a bitwise OR operation between the local border router Bloom filter 34 and the identified service Bloom filter 32). The service agent device 16 in operation 88 also can aggregate and propagate the identified service bloom filter 32 with other service agent devices 16, for example in the form of a DAO message specifying the subnetwork Bloom filter 44 (or the identified service Bloom filter 32) toward the DODAG root (e.g., from node "N12" to the root "BBR_A"), or a peer announcement of an updated local border router Bloom filter 34 between the border router devices 18.

Hence, FIG. 5 illustrates updating the Bloom filters 30, 34, and/or 44 in response to a new identified service Bloom filter 32 identifying a new identified service 36, without the necessity of multicast traffic throughout the LLN 14.

The service agent devices 16 also can execute service discovery operations, relative to the Bloom filter bit vectors 30, 34, and/or 44, in the form of responding to query messages from a service consumer device 28, for example a service discovery query message (i.e., service query message), or a service request message. Hence, the Bloom filter operations of FIG. 2 can be used to determine whether the requested service is not present in the data network 10.

Figure 6:
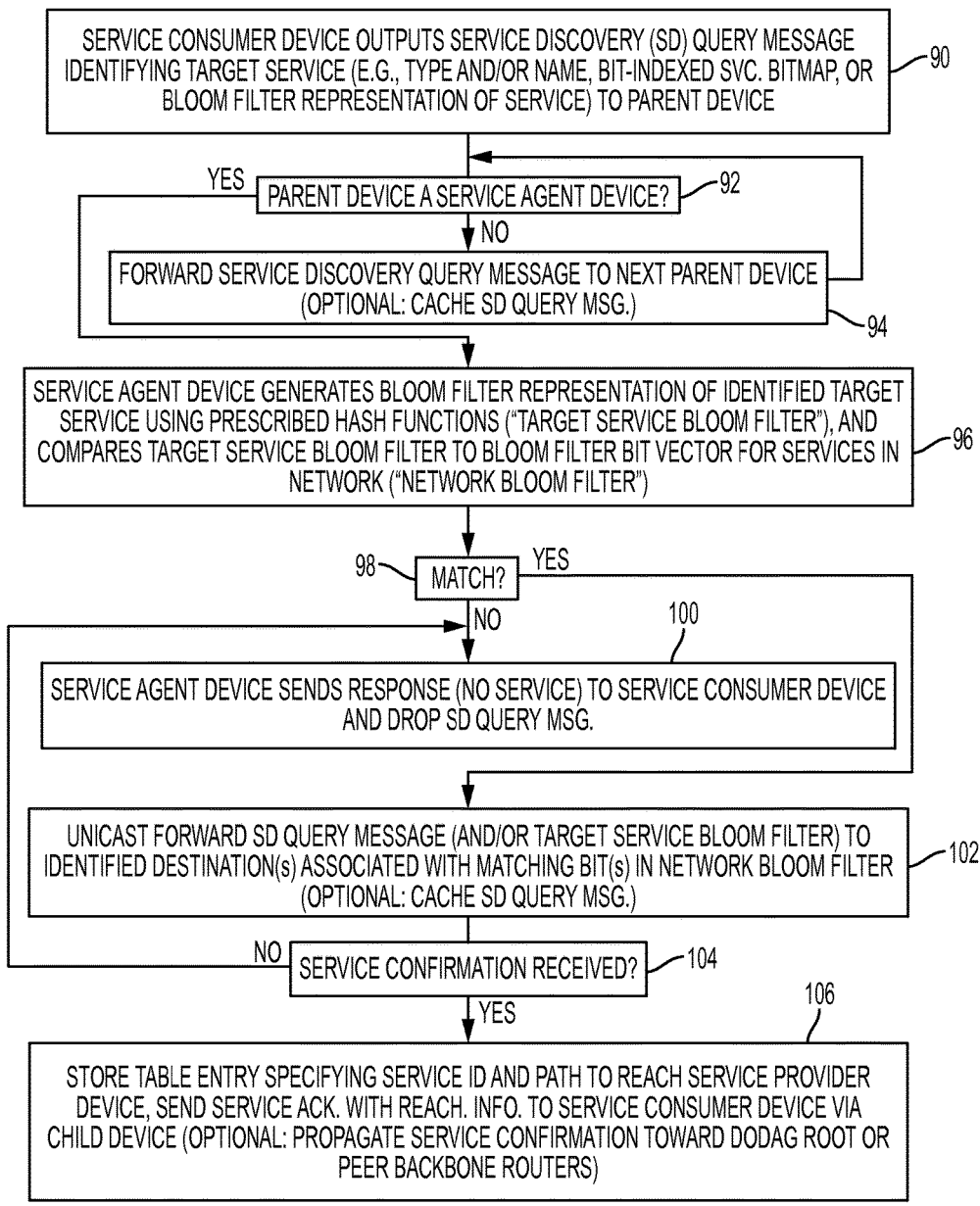
FIG. 6 illustrates an example service discovery operation based on the generated Bloom filter bit vector, according to an example embodiment.

FIG. 6 illustrates service query message processing by a service agent device 16, according to an example embodiment. A service consumer device (e.g., "N32") 28 in operation 90 can output to its parent device (e.g., "N31") 12 a service discovery (SD) query message that identifies a target service, for example by service type 56, service name 58, by a bit-indexed service bitmap 60 (if known), or by the Bloom filter representation 32 of the service (if known). Assuming the parent device (e.g., "N31") 12 in operation 92 is not a service agent device 16, the parent device 12 in operation 94 can forward the service discovery query message to the next parent device, for example its border router device "BBR_C" 18. As described previously with respect to operation 74 of FIG. 5, the parent device 12 also can cache the SD query message in its memory circuit 54.

Assuming a service agent device 16 (e.g., the border router device "BBR_C" 18) receives the SD query message in operation 92, the processor circuit 52 of the service agent device 16 in operation 96 generates the target service Bloom filter 32 (if needed) based on executing the hashing operation 38 of FIG. 2 (as in operation 76 of FIG. 5), and compares the target service Bloom filter 32 with the network Bloom filter 30 (as in operation 42 of FIG. 2 and operation 76 of FIG. 5). If in operation 98 there is no match between all of the bits of the target service Bloom filter 32 and the network Bloom filter 30, the memory circuit 54 of the service agent device 16 in operation 100 sends a "no service" response to the service consumer device (e.g., "N32") via its next-hop child device (e.g., "N31") 12, and drops the SD query message.

If in operation 98 there is a match between all the bits of the target service Bloom filter 32 and the respective bits of the network Bloom filter 30, the processor circuit 52 of the service agent executed in the border router device "BBR_C" 18 in operation 102 can initiate resolution of the matching bits based on unicast forwarding the SD query message (and/or the target service Bloom filter 32) to the identified destinations associated with the matching bits in the network Bloom filter 30. For example, if all the set bits of the target service Bloom filter 32 also are set in the identified service Bloom filter 32d, the border router device "BBR_C" 18 can unicast forward the SD query message (or at least the corresponding the target service Bloom filter 32) to the border router device "BBR_D" 18 for localized resolution. If the processor circuit 52 of the border router device "BBR_D" 18 determines an exact match between the target service Bloom filter 32 forwarded from the border router device "BBR_D" and a locally-stored identified service Bloom filter 32 (e.g., "BF_S4") specified in a Bloom filter table entry 64c, the service agent executed by the border router device "BBR_D" 18 can send to the border router device "BBR_C" 18 a service confirmation responsive to the SD query message that the identified service 36 (and/or its Bloom filter representation "BF_S4" 32) is reachable via the border router device "BBR_D" 18.

In response to the border router device "BBR_C" 18 receiving the service confirmation in operation 104 from the border router device "BBR_D", the processor circuit 52 of the border router device "BBR_C" 18 in operation 106 can store a table entry specifying the identified service 36 (and/or its Bloom filter representation "BF_S4" 32) is reachable via the border router device "BBR_D" 18. The processor circuit 52 of the border router device "BBR_C" 18 in operation 106 also can send a service acknowledgment unicast to the service consumer device "N32" 28 the identified service 36 (and/or its Bloom filter representation "BF_S4" 32) is reachable via the border router device "BBR_D" 18. Hence, the service consumer device "N32" 28 can receive a service acknowledgement with reachability information, even if the identified service is executed by a service provider device (e.g., "N44") 26 in a different network domain.

As apparent from the foregoing, the service provider devices 26 may be configured for periodically outputting additional service announcement messages as "keep-alive" messages to ensure that the identified service is still available. Each service agent device 16 can be configured for deleting a stale service table entry 66 if the corresponding "keep-alive" message is not received within a prescribed interval (e.g., 1 day). Each service agent device 16 also can be configured for recalculating the network Bloom filter 30 based on removal of the corresponding identified service Bloom filter 32 in the stale service table entry 66, and reporting the updated network Bloom filter 30 to the other service agent devices 16.

Figure 7:
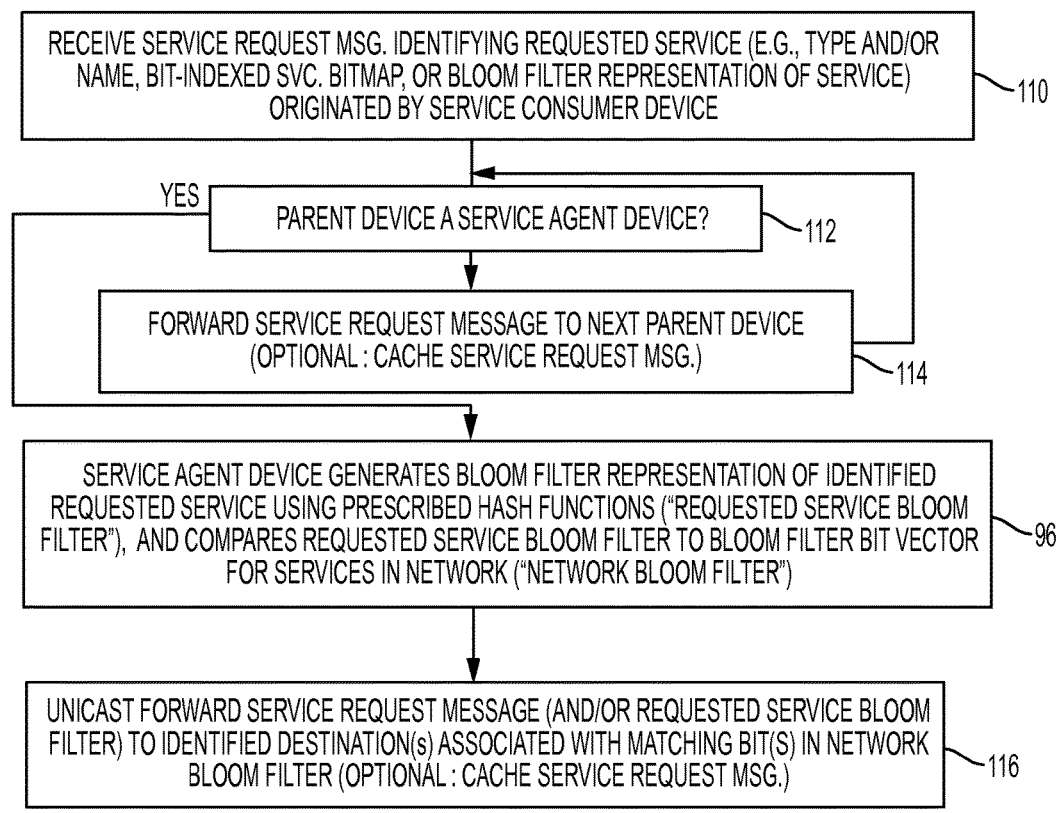
FIG. 7 illustrates another example service discovery operation based on the generated Bloom filter bit vector, according to an example embodiment.

FIG. 7 illustrates service request message processing by a service agent device 16, according to an example embodiment. The service request message can be output by a service consumer device (e.g., "N32") and can specify the requested service (e.g., the identified service 36), and reachability information (e.g., a border router "BBR_D" 18 or an identifier for the destination service provider device (e.g., "N44" 26). The service request message processing can be used to prevent unnecessary propagation of service request messages if a service is no longer available. A parent network device (e.g., "N31") 12 in operation 110 can receive a service request message that identifies an identified service 36, for example based on service type 56, service name 58, bit-indexed service bitmap 60, and/or identified service Bloom filter 32. If in operation 112 the parent device (e.g., "N31") 12 is not a service agent device 16 (as in operation 72 of FIG. 5 or operation 92 of FIG. 6), the parent network device 12 can forward the service request message to its next-hop parent (border router device "BBR_C" 18) in operation 114 (and optionally cache the service request message).

The service agent executed by the border router device "BBR_C" 18 in operation 96 of FIG. 7 performs the same generation of the target service Bloom filter 32 (if needed) based on executing the hashing operation 38 of FIG. 2 (as in operation 76 of FIG. 5), and compares the target service Bloom filter 32 with the network Bloom filter 30 (as in operation 42 of FIG. 2 and operation 76 of FIG. 5). If there is no match between all of the bits of the target service Bloom filter 32 and the network Bloom filter 30, the memory circuit 54 of the service agent device 16 in sends a "no service" response to the service consumer device (e.g., "N32") via its next-hop child device (e.g., "N31") 12, and drops the service request message.

Assuming there is a match (as in operation 98 of FIG. 6), the service agent executed by the border router device "BBR_C" 18 in operation 116 unicast forwards the service request message as described previously with respect to operation 102 for processing by the identified destination(s) associated with any matching bits. Hence, unicast forwarding of the service request is limited to only those destinations that may be responsive to the service request. As described previously, the service request also may be dropped (and a "no service" response returned) if there is no match between the target service Bloom filter and the network Bloom filter 30.

Figure 8:
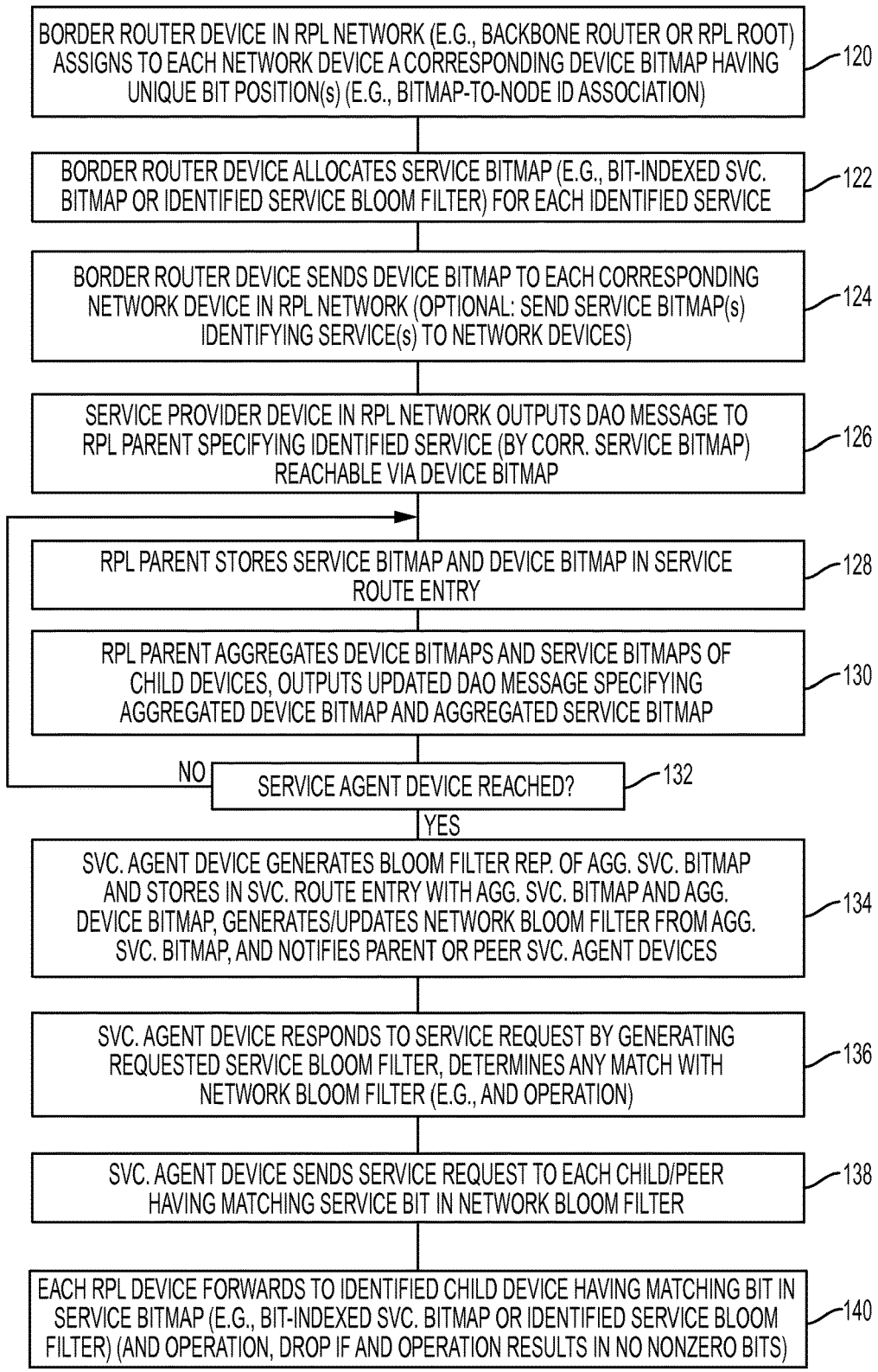
FIG. 8 illustrates another example of generating a Bloom filter bit vector representing services provided by service provider devices in the network for executing service discovery operations, according to an example embodiment.

FIG. 8 illustrates another example of generating a Bloom filter bit vector representing services provided by service provider devices in the network for executing service discovery operations, according to an example embodiment. FIG. 8 illustrates an example where the identified service 36 is based on a unique bit position having been assigned to the identified service 36 in a bit-indexed service bitmap 60, and the network Bloom filter 30 is based on forming an aggregated service bitmap (68 of FIG. 2). Each wireless network device 12 (or at least within a specific domain of a given border router device 18) also can be allocated a unique device bitmap, enabling service discovery and service routing (as well as network-based routing) to be executed based on the assigned bit-indexed service bitmap 60 and the assigned device bitmap. FIG. 8 also assumes that the wireless network devices "N41" through "N4B" 12 in the domain "D" can attach to the border router device "BBR_D" 18 according to a routing protocol such as routing protocol for low-power and lossy networks (RPL), although other techniques can be used to establish the DAG topology of the domain "D".

FIG. 8 illustrates that an apparatus (e.g., border router device "BBR_D" 18, a network manager, etc.) in operation 120 can assign to each wireless network device 12 in a given "domain" (e.g., domain "D" rooted by the border router device "BBR_D" 18) a corresponding device bitmap having a unique bit position, resulting in a specific bitmap-to-node identifier association. The apparatus (e.g., the border router device "BBR_D" 18 or a network manager) in operation 122 can assign a service bitmap to each corresponding service. The service bitmap can be implemented either as the bit-indexed service bitmap 60 of FIG. 3, or the corresponding identified service Bloom filter 32 generated for the corresponding service.

Hence, the network devices "N41" through "N4B" 12 in the domain "D" as illustrated in FIG. 1 can be allocated the following device bitmaps and bit-indexed service bitmaps illustrated in Table 1:

TABLE 1

Bitmap Allocations in Domain "D"

| Device ID (FIG. 1) | Device Bitmap | Bit-Indexed Service Bitmap |
|---|---|---|
| N41 | 00000000001 | (Null) |
| N42 | 00000000010 | (Null) |
| N43 | 00000000100 | (Null) |
| N44 | 00000001000 | 0000100000 |
| N45 | 00000010000 | (Null) |
| N46 | 00000100000 | 0001000000 |
| N47 | 00001000000 | (Null) |
| N48 | 00010000000 | (Null) |
| N49 | 00100000000 | 0010000000 |
| N4A | 01000000000 | 0100000000 |
| N4B | 10000000000 | 1000000000 |

The bitmap allocations can be performed, for example, on a per-domain basis.

As illustrated in Table 1, the service executed by the service provider device "N44" 26 is allocated the bit-indexed service bitmap "0000100000"; the service executed by the service provider device "N46" 26 is allocated the bit-indexed service bitmap "0001000000"; the service executed by the service provider device "N49" 26 is allocated the bit-indexed service bitmap "0010000000"; the service executed by the service provider device "N4A" is allocated the bit-indexed service bitmap "0100000000"; and the service executed by the service provider device "N4B" is allocated the bit-indexed service bitmap "1000000000". Hence, in relatively small domains (e.g., less than 100 devices) the bit-indexed service bitmaps can be used for identifying services within a domain (as opposed to the Bloom filter representations 32 that have no limit to network size or the number of services).

Assuming the network devices "N41" through "N4B" are organized as a DAG in a RPL network, the border router device "BBR_D" 18 in operation 124 can send the device bitmap to each wireless network device 12 in the domain "D"; the border router device "BBR_D" 18 also can send the corresponding service bitmap (60 or 32) that uniquely identifies the corresponding service executed by a service provider device 26 in the domain "D".

A service provider device (e.g., "N4B") 26 in operation 126 can create and output a DAO service message to its RPL parent device "N49" 12 specifying that its identified service 36 (represented by the corresponding service bitmap (e.g., the 10-bit bit-indexed service bitmap "1000000000" 60 or its corresponding Bloom filter representation "BF_S8" 32) is reachable via the corresponding 11-bit device bitmap "10000000000" allocated to the service provider device "N4B" 26. The RPL parent device "N49" (operating in storing mode) in operation 128 can store a service route entry specifying that the bit-indexed service bitmap "1000000000" 60 (or its corresponding Bloom filter representation "BF_S8" 32) is reachable via the child device bitmap "10000000000" allocated to the child network device "N4B" 12. The RPL parent device "N49" also can receive a DAO service message from the child device "N4A" 12 specifying reachability of the identified service (e.g., the bit-indexed service bitmap "0100000000" or its corresponding Bloom filter representation "BF_S7" 32) is reachable via the child device bitmap "01000000000"; hence, the RPL parent device "N49" can aggregate in operation 130 the device bitmaps and service bitmaps of the child devices using respective OR operations, including its own identified service (e.g., the bit-indexed service bitmap "0010000000" or its corresponding Bloom filter representation "BF_S6" 32) and its device bitmap "0010000000".

Hence, the RPL parent device "N49" in operation 130 can output an updated DAO service message specifying the aggregated 10-bit service bitmap "1110000000" 68 (or the aggregated Bloom filter "BF_S6 OR BF_S7 OR BF_S8") reachable via the aggregated 11-bit device bitmap "11100000000", based on the following stored table entries in service provider device "N49" 26 illustrated in Table 2:

TABLE 2

Table Entries in N49

| BF_Target (Optional) | Child Device ID | Device Bitmap | Bit-Indexed Service Bitmap |
|---|---|---|---|
| BF_S6 | N49 (Self) | 00100000000 | 0010000000 |
| BF_S7 | N4A | 01000000000 | 0100000000 |
| BF_S8 | N4B | 10000000000 | 1000000000 |

The updating of stored table entries in response to a received DAO service message in operations 128 and 130 is repeated in each network device "N47" and "N45" 12 until a service agent device (e.g., "N42") 16 is reached in operation 132. Hence, the network device "N47", in response to receiving updated DAO service messages from network devices "N49" and "N48", outputs an updated DAO service message specifying the same aggregated service bitmap 1110000000" 68 (or the aggregated Bloom filter "BF_S6 OR BF_S7 OR BF_S8") but an updated aggregated device bitmap "11111000000" including the OR aggregation of network devices "N47 and "N48".

The network device "N45" outputs an updated DAO service message, that is received by the service agent device "N42" in operation 132, specifying the same aggregated service bitmap 1110000000" 68 (or the aggregated Bloom filter "BF_S6 OR BF_S7 OR BF_S8") but an updated aggregated device bitmap "11111010000" including OR aggregation of the network device "N45" with the network devices "N47", "N48", "N49", "N4A" and "N4B". The service agent device "N42" 16 also receives from the child network device "N46" 12 a second updated DAO service message specifying that aggregated service bitmap "0101000000" 68 (or the aggregated Bloom filter "BF_S5 OR BF_S7") and the aggregated device bitmap "01010100000" representing the network devices "N46, "N48", and "N4A".

Hence, the service agent device "N42" 16 in step 134 can store in its memory circuit 54 the following table entries for reaching the aggregated services via the aggregated device identifiers:

TABLE 3

Table Entries in N42

| Aggregated Bloom Filter | Child Device ID | Aggregated Device Bitmap | Aggregated Service Bitmap |
|---|---|---|---|
| BF_S6 OR BF_S7 OR BF_S8 | N45 | 11111010000 | 1110000000 |
| BF_S5 OR BF_S7 | N46 | 01010100000 | 0101000000 |

The service agent device "N42" 16 in operation 134 also can generate the bloom filter representation "BF_N42" 44 based on the aggregated service bitmaps 68 received from its child devices (operation 142 of FIG. 3), and can update the network Bloom filter 30 as described previously with respect to operations by performing a bitwise OR operation. The service agent device "N42" 16 also in operation 134 can send its own updated DAO service message that specifies the bloom filter representation "BF_N42" 44 is reachable via the aggregated device bitmap "11111110010"; the service agent device "N42" 16 also can include the aggregated service bitmap "1111000000". Hence, the updated DAO service message forwarded by the device "N41" to the border router device "BBR_D" 18 can specify reachability to the bloom filter representation "BF_N42" 44 and the aggregated service bitmap "1111100000" 68 (including the bitmap representation of the service provided by the service provider device "N44" 26) via the aggregated device bitmap "11111111111" (including the bitmap representations of all the devices "N41" through "N4B" in the domain "D").

The border router device "BBR_D" 18 in operation 134 also can update its network Bloom filter 30 based on executing a hashing operation 38 on the aggregated service bitmap 68 as illustrated in FIG. 2, resulting in the local border router Bloom filter 34*a* which can be aggregated with the network Bloom filter 30 based on a bitwise OR operation. The border router device "BBR_D" 18 in operation 134 can create a table entry specifying the local border router Bloom filter 34*a*, the corresponding aggregated service bitmap 68 identifying identified services, and the reachability information for reaching the identified services via the aggregated device bitmap "11111111111". The border router device "BBR_D" 18 in operation 134 also can update the peer border routers with the updated local border router Bloom filter 34*a*.

Hence, the service agent device "N42" 16 or "BBR_D" 16 in operation 136 can respond to a service request by generating the corresponding identified service Bloom filter 32, and determine if there is any match with the network Bloom filter 30 as described previously with respect to Equation (1) and the previously-described operations 78 and 98. The service agent device "N42" 16 or "BBR_D" 16 in operation 138 can unicast the service request to each child or peer having the matching service bit in the network Bloom filter 30, based on forwarding the service request specifying the bit-indexed service bitmap 60 to the aggregated device bitmap "11111111111". (If there is no match with the network Bloom filter 30 then the service request is dropped).

In response to a RPL device 12 in the domain "D" receiving the service request, the RPL device in operation 140 performs an AND operation between the bit-indexed service bitmap 60 (or the identified service Bloom filter 32) and the aggregated Bloom filter or aggregated service bitmaps in the stored table entries: the resulting AND operation in operation 140 resolves the destination service specified in the table entries, enabling each RPL device 12 in the domain "D" to forward the service request toward the destination service provider device 26 based on performing successive AND operations between the bit-indexed service bitmap 60 (or the identified service Bloom filter 32) relative to the aggregated service bitmap entries stored in the network devices.

According to example embodiments, service discovery operations can be optimized for on-demand and scalable execution, based on identifying the services executed by service provider devices using Bloom filter representations.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:
    receiving, by a network device implemented as a first backbone router of a backbone network and operating as a border router of a low-power and lossy network (LLN) having a tree-based topology for reaching the network device, a first received message from a child network device in the LLN and the first received message specifying an identified service;
    generating, by the network device, a Bloom filter bit vector representing services provided by service provider devices in at least one of the LLN or reachable via the backbone network, including selectively updating the Bloom filter bit vector to include the identified service is reachable via the child network device;
    receiving, by the network device via the backbone network from a second backbone router operating as a corresponding second border router of a second LLN, a second received message specifying a second identified service;
    the network device executing a service discovery operation based on identifying, relative to the Bloom filter bit vector, whether the second identified service in the second received message is executed in any one of the LLN or via the backbone network, based on determining whether set bits of a Bloom filter representation of the second identified service match the respective bits of the Bloom filter bit vector, wherein if there is at least one non-matching bit, the second identified service is not in the Bloom filter bit vector and not executed in the LLN; and
    selectively sending a selected response to the second backbone router based on the service discovery operation, wherein the selected response is one of a service unavailable message, a duplicate detected message, a no duplicate message, a service acknowledgement message, a service confirmation message, or a message with reachability information for reaching the identified service.

2. The method of claim 1, wherein:
the executing of the service discovery operation further comprising generating the Bloom filter representation of the second identified service, and comparing with the Bloom filter bit vector;
the generating including adding the Bloom filter representation of the second identified service to the Bloom filter bit vector, to form an updated Bloom filter bit vector, in response to a determined absence of any matching bit of the Bloom filter representation in the Bloom filter bit vector.

3. The method of claim 2, wherein the identified service is based on a unique bit position having been assigned to the identified service in a service bitmap, the generating further comprising storing a table entry identifying the Bloom filter representation of the identified service, the corresponding service bitmap identifying the identified service, and reachability information for reaching the identified service via the child network device having transmitted the received message to the network device.

4. The method of claim 3, wherein the generating further comprises forming an aggregated service bitmap based on aggregating the service bitmap from the child network device with a second service bitmap identifying a third identified service reachable via a second child network device in the LLN, the Bloom filter bit vector based on the aggregated service bitmap.

5. The method of claim 4, wherein the first received message comprises a destination advertisement object (DAO) message comprising the service bitmap for indicating at least the identified service is reachable via the child network device.

6. The method of claim 1, wherein the Bloom filter bit vector is based on at least one of service type, service name, or service bitmap for each of the services provided by the service provider devices, the executing of the service discovery operation further including generating the Bloom filter representation of the identified service for comparison with the Bloom filter bit vector.

7. The method of claim 1, wherein the executing of the service discovery operation further includes at least one of:
if there are matching bits with no non-matching bits in the Bloom filter bit vector relative to the Bloom filter representation, sending a first message to an identified destination device associated with one or more of the matching bits, the first message one of a service discovery query in response to a device-initiated service discovery query specified in the second received message, or a forwarded service request in response to a service request specified in the second received message; or
if there is the at least one non-matching bit in the Bloom filter bit vector relative to the Bloom filter representation, adding the Bloom filter representation to the Bloom filter bit vector in response to the second received message specifying a service announcement of the second identified service by an identified service provider device, or dropping the second received message in response to the second received message specifying the service request and sending to the second network device the selected response as a service unavailable message.

8. The method of claim 1, wherein the executing of the service discovery operation includes at least one of:
duplicate service detection based on determining whether the second identified service offered by a service provider device is already identified in the Bloom filter bit vector;
new service announcement message processing based on adding a Bloom filter representation of the second identified service to the Bloom filter bit vector;
service query message processing including one of responding to the second backbone router with reachability information for reaching the second identified service in response to determining the second identified service is represented in the Bloom filter bit vector, or dropping the second received message in response to determining the second identified service is not represented in the Bloom filter bit vector; or
service request message processing including forwarding the second received message to an identified destination associated with a matching bit of the Bloom filter representation of the second identified service in the Bloom filter bit vector.

9. An apparatus comprising:
a device interface circuit configured for receiving a first received message in a low power and lossy network (LLN), the apparatus implemented as a network device operating as a first backbone router of a backbone network and operating as a border router of the LLN having a tree-based topology for reaching the apparatus, the first received message from a child network device in the LLN and the first received message specifying an identified service, the device interface circuit further configured for receiving via the backbone network a second received message from a second backbone router operating as a corresponding second border router of a second LLN, the second received message specifying a second identified service; and
a processor circuit configured for generating a Bloom filter bit vector representing services provided by service provider devices in at least one of the LLN or reachable via the backbone network, the processor circuit further configured for selectively updating the Bloom filter bit vector to include the identified service is reachable via the child network device;
the processor circuit further configured for executing a service discovery operation based on identifying, relative to the Bloom filter bit vector, whether the second identified service in the second received message is executed in any one of the LLN or via the backbone network, based on determining whether set bits of a Bloom filter representation of the second identified service match the respective bits of the Bloom filter bit vector, wherein if there is at least one non-matching bit, the second identified service is not in the Bloom filter bit vector and not executed in the LLN;
the processor circuit further configured for selectively generating and sending a selected response to the second backbone router based on the service discovery operation, wherein the selected response is one of a service unavailable message, a duplicate detected message, a no duplicate message, a service acknowledgement message, a service confirmation message, or a message with reachability information for reaching the identified service.

10. The apparatus of claim 9, wherein:
the processor circuit further is configured for generating the Bloom filter representation of the second identified service, and comparing with the Bloom filter bit vector;
the processor circuit further configured for adding the Bloom filter representation of the second identified service to the Bloom filter bit vector, to form an updated Bloom filter bit vector, in response to a determined absence of any matching bit of the Bloom filter representation in the Bloom filter bit vector.

11. The apparatus of claim 10, wherein:
the apparatus further comprises a memory circuit;
the identified service is based on a unique bit position having been assigned to the identified service in a service bitmap, the processor circuit further configured for storing, in the memory circuit, a table entry identifying the Bloom filter representation of the identified service, the corresponding service bitmap identifying the identified service, and reachability information for reaching the identified service via the child network device having transmitted the received message to the apparatus.

12. The apparatus of claim 11, wherein the processor circuit further is configured for forming an aggregated service bitmap based on aggregating the service bitmap from the child network device with a second service bitmap identifying a third identified service reachable via a second child network device, the Bloom filter bit vector based on the aggregated service bitmap in the LLN.

13. The apparatus of claim 12, wherein the first received message comprises a destination advertisement object (DAO) message comprising the service bitmap for indicating at least the identified service is reachable via the child network device.

14. The apparatus of claim 9, wherein the Bloom filter bit vector is based on at least one of service type, service name, or service bitmap for each of the services provided by the service provider devices, the processor circuit configured for generating the Bloom filter representation of the identified service for comparison with the Bloom filter bit vector.

15. The apparatus of claim 9, wherein the processor circuit is configured for executing the service discovery operation based on at least one of:
if there are matching bits with no non-matching bits in the Bloom filter bit vector relative to the Bloom filter representation, sending a first message to an identified destination device associated with one or more of the matching bits, the first message one of a service discovery query in response to a device-initiated service discovery query specified in the second received message, or a forwarded service request in response to a service request specified in the second received message; or
if there is the at least one non-matching bit in the Bloom filter bit vector relative to the Bloom filter representation, adding the Bloom filter representation to the Bloom filter bit vector in response to the second received message specifying a service announcement of the second identified service by an identified service provider device, or dropping the second received message in response to the second received message specifying the service request and sending to the second network device the selected response as a service unavailable message.

16. The apparatus of claim 9, wherein the processor circuit is configured for executing the service discovery operation as at least one of:
duplicate service detection based on determining whether the second identified service offered by a service provider device is already identified in the Bloom filter bit vector;
new service announcement message processing based on adding a Bloom filter representation of the second identified service to the Bloom filter bit vector;
service query message processing including one of responding to the second backbone router with reachability information for reaching the second identified service in response to determining the second identified service is represented in the Bloom filter bit vector, or dropping the second received message in response to determining the identified service is not represented in the Bloom filter bit vector; or
service request message processing including forwarding the second received message to an identified destination associated with a matching bit of the Bloom filter representation of the second identified service in the Bloom filter bit vector.

17. One or more non-transitory tangible media encoded with logic for execution by a machine and when executed by the machine operable for:
receiving, by the machine implemented as a network device further implemented as a first backbone router of a backbone network and operating as a border router of a low-power and lossy network (LLN) having a tree-based topology for reaching the network device, a first received message from a child network device in the LLN and the first received message specifying an identified service;
generating, by the machine, a Bloom filter bit vector representing services provided by service provider devices in at least one of the LLN or reachable via the backbone network, including selectively updating the Bloom filter bit vector to include the identified service is reachable via the child network device;
receiving, by the network device via the backbone network from a second backbone router operating as a corresponding second border router of a second LLN, a second received message specifying a second identified service;
the machine executing a service discovery operation based on identifying, relative to the Bloom filter bit vector, whether the second identified service in the second received message is executed in any one of the LLN or via the backbone network, based on determining whether set bits of a Bloom filter representation of the second identified service match the respective bits of the Bloom filter bit vector, wherein if there is at least one non-matching bit, the second identified service is not in the Bloom filter bit vector and not executed in the LLN; and
selectively sending a selected response to the second backbone router based on the service discovery operation, wherein the selected response is at least one of a service unavailable message, a duplicate detected message, a no duplicate message, a service acknowledgement message, a service confirmation message, or a message with reachability information for reaching the identified service.

18. The one or more non-transitory tangible media of claim 17, wherein the executing of the service discovery operation includes at least one of:

duplicate service detection based on determining whether the second identified service offered by a service provider device is already identified in the Bloom filter bit vector;

new service announcement message processing based on adding a Bloom filter representation of the second identified service to the Bloom filter bit vector;

service query message processing including one of responding to the second backbone router with reachability information for reaching the second identified service in response to determining the second identified service is represented in the Bloom filter bit vector, or dropping the second received message in response to determining the second identified service is not represented in the Bloom filter bit vector; or service request message processing including forwarding the second received message to an identified destination associated with a matching bit of the Bloom filter representation of the second identified service in the Bloom filter bit vector.

19. The one or more non-transitory tangible media of claim 17, wherein:

the executing of the service discovery operation further comprising-generating the Bloom filter representation of the second identified service, and comparing with the Bloom filter bit vector;

the generating including adding the Bloom filter representation of the second identified service to the Bloom filter bit vector, to form an updated Bloom filter bit vector, in response to a determined absence of any matching bit of the Bloom filter representation in the Bloom filter bit vector.

* * * * *